US008966005B2

(12) United States Patent
Yasukawa et al.

(10) Patent No.: US 8,966,005 B2
(45) Date of Patent: Feb. 24, 2015

(54) INFORMATION PROCESSING SYSTEM AND METHOD PROVIDING A COMPOSED SERVICE

(75) Inventors: Kenta Yasukawa, Tokyo (JP); Martin Gerdes, Monshau-Rohren (DE); Takeshi Matsumura, Yokohama (JP); Toshikane Oda, Tokyo (JP)

(73) Assignee: Telefonaktiebolatet L M Ericsson (publ), Stockholm (SE)

( * ) Notice: Subject to any disclaimer, the term of this patent is extended or adjusted under 35 U.S.C. 154(b) by 306 days.

(21) Appl. No.: 13/257,428

(22) PCT Filed: May 1, 2009

(86) PCT No.: PCT/JP2009/058870
§ 371 (c)(1),
(2), (4) Date: Sep. 19, 2011

(87) PCT Pub. No.: WO2010/125697
PCT Pub. Date: Nov. 4, 2010

(65) Prior Publication Data
US 2012/0011222 A1 Jan. 12, 2012

(51) Int. Cl.
*G06Q 30/02* (2012.01)
*H04L 29/08* (2006.01)
*H04L 29/06* (2006.01)

(52) U.S. Cl.
CPC .............. *H04L 67/16* (2013.01); *H04L 67/02* (2013.01); *H04L 65/1036* (2013.01)
USPC ........................................................ 709/217

(58) Field of Classification Search
USPC ................................................. 709/217–219
See application file for complete search history.

(56) References Cited

U.S. PATENT DOCUMENTS

2005/0210155 A1 9/2005 Oeda et al.
2007/0083618 A1 4/2007 Kim

FOREIGN PATENT DOCUMENTS

WO WO 2007/140981 A1 12/2007

OTHER PUBLICATIONS

Modular Exposure of Next Generation Network Services to Enterprises and Testbed Federations. Florian Schreiner, Sebastian Wahle, Niklas Blum, Thomas Magedan Sep. 8, 2008.*
(Continued)

*Primary Examiner* — Vivek Srivastava
*Assistant Examiner* — Sibte Bukhari
(74) *Attorney, Agent, or Firm* — Myers Bigel Sibley & Sajovec, P.A.

(57) ABSTRACT

An information processing system providing a composed service to a user device is provided. The system includes: a service acquisition unit configured to acquire descriptions defining raw services; a capability information acquisition unit configured to acquire capability information; a composition unit configured to compose the acquired descriptions to create a description which defines a composed service to be supported by the user device based on the acquired capability information; a presentation unit configured to present the created description to the user device; a request acquisition unit configured to acquire a request for the composed service from the user device; a specifying unit configured to specify raw services composing the requested composed service; a processing unit configured to gather responses from the specified raw services composing the requested composed service, and to create the composite response; and a response unit configured to respond the composite response to the user device.

6 Claims, 9 Drawing Sheets

(56) References Cited

OTHER PUBLICATIONS

A Self-Adaptive Service Provisioning Framework for 3G+/4G Mobile Applications Sascha Karlich, Siemens Oct. 2004.*
International Search Report, PCT Application No. PCT/JP2009/058870, Aug. 18, 2009.
Written Opinion of the International Searching Authority, PCT Application No. PCT/JP2009/058870, Aug. 18, 2009.
International Preliminary Report on Patentability, PCT Application No. PCT/JP2009/058870, May 31, 2011.
Espinosa Carlin, "Realizing Service Composition in the IP Multimedia Subsystem", *Proceedings of the 1st ITU-T Kaleidoscope Conference Innovations in NGN—Future Network and Services*, May 13, 2008, pp. 343-350.
Karlich et al., "A Self-Adaptive Service Provisioning Framework for 3G+/4G Mobile Applications", *IEEE Wireless Communications*, vol. 11, No. 5, Oct. 2004, pp. 48-56.
Schreiner et al., "Modular Exposure of Next Generation Network Services to Enterprises and Testbed Federations", *ICCE 2008—Second International Conference on Communications and Electronics*, Jun. 6, 2008, pp. 98-103.

* cited by examiner

FIG. 7

| Service ID 701 | Service name 702 | Capability 703 | Device class 704 |
|---|---|---|---|
| S1 | VoD | Video/Mpeg2 | DMS |
| S2 | Transcoding | H.264 ↔ Mpeg2 | N/A |
| S3 | Photo Sharing | Picture/Jpeg | DMS |
| S4 | Video Sharing | Video/H.264 | DMS, DMR |
| S5 | Photo Slideshow | Jpeg → H.264 | N/A |
| S6 | S3+S5 | Video/H.264 | DMS |

| Device ID 801 | Device name 802 | Capability 803 | Device class 804 |
|---|---|---|---|
| D1 | TV | Video/Mpeg2 | DMR |
| D2 | Game Console | Video/Mpeg2, Video/H.264, Picture/H.264 | DMP |
| D3 | Home NAS | Video/Mpeg2 | DMS |

FIG. 9

313  
SDPL

| Service ID 901 | Device ID 902 | Needed virtual device 903 | Invoked Services 904 |
|---|---|---|---|
| S1 | D1 | DMS | S1 |
| S1 | D2 | DMS | S1 |
| S3 | D1 | DMS | S2, S3, S5 |
| S3 | D2 | DMS | S3 |
| S4 | D1 | DMS | S4 |
| S4 | D2 | DMS | S4 |
| S4 | D3 | DMR | S2, S4 |
| S6 | D1 | DMS | S2, S3, S5 |
| S6 | D2 | DMS | S3, S5 |

INFORMATION PROCESSING SYSTEM AND METHOD PROVIDING A COMPOSED SERVICE

CROSS REFERENCE TO RELATED APPLICATION

This application is a 35 U.S.C. §371 national stage application of PCT International Application No. PCT/JP2009/058870, filed on 1 May 2009, the disclosure and content of which is incorporated by reference herein in its entirety. The above-referenced PCT International Application was published in the English language as International Publication No. WO 2010/125697 A1 on 4 Nov. 2010.

TECHNICAL FIELD

The present invention relates to an information processing system and method providing a composed service.

BACKGROUND

People today use multiple digital devices which are interconnected by various kinds of LAN (Local Area Network) and PAN (Personal Area Network) technologies. UPnP™ (Universal Plug and Play) and DLNA® (Digital Living Network Alliance) are standards focusing on the media consumption within home LANs, and allow users to play for example media stored in their network accessed storage (NAS) on a TV set in their living room. Furthermore, people have multiple portable devices and gadgets that are getting connected by LAN and PAN technologies while walking on the streets. At the same time, a lot of services are available in the Internet, offered by service providers or even by the user's own home networks, accessible through WAN (Wide Area Network) technologies. Numerous video sharing sites are available on the Internet. Also, many Internet radio stations are available, and Podcast sites offer audio and video together with well-formed meta-data.

Although people have started to create their personal networks (PN) of multiple devices that are connected via LAN connectivity, and use various services throughout their PNs, there are still many issues to use WAN services on PN devices.

Service composition, which creates a target service which is composed by multiple small services, is currently, a hot topic in this field. There are a number of XML-based standards to formalize the specification of web services, their flow composition and execution. For example, WSDL (Web Services Description Language) is used to express web services and BPEL4WS (Business Process Execution Language for Web Services) is used to describe the composition flow. The considered media devices, however, have limited capabilities according to their target use cases, and hence do not support every service, protocol, or media type available in the Internet. They only support limited operations and media types defined in their specifications and can usually not easily be extended as PCs. Therefore, a user can only enjoy a limited set of services on a particular device. For example, a device which only supports MPEG-2 video format cannot play out video content offered by a service provider that only distributes video in H.264 format. In such a case, transcoding could be applied so that the device can play out the video anyway; however, the user requires the skills, tools, and computational power to do the transcoding, or an external service provider has to perform the operation. An example of such transcoding service is OMA STI (Standard Transcoding Interface). In this case, the device cannot access the video content from the service provider on the fly and transcoding must be applied before. Service composition may enable to create a service which is composed of the content service and transcoder service. However, service composition is not usually performed for specific set of devices; hence the composed service does not always suit for each and every device.

Moreover, a device can only communicate with those services that support the same protocol set as the device. For example, UPnP™ devices are designed to communicate with other devices that also support the UPnP™ protocol, but the UPnP™ devices usually cannot communicate using other protocols. In order to use UPnP™ devices together with devices and services that communicate with a different set of protocols, there needs to be a protocol gateway between the different protocol domains.

Such a protocol conversion and bridging functionality between Web services and UPnP™ devices are found in the prior art. For example, US20070083618 proposes a technique in which a home network device can provide a home network device service to an external device through web service without directly installing web service associated functions therein. US20050210155 proposes an information processing apparatus including an information apparatus compatible with the UPnP™ discovery and an information apparatus compatible with the Web based discovery. WO2007140981 proposes a proxy-bridge for connecting UPnP compliant devices with Bluetooth® compliant devices. However, the prior art only addresses a static and specific set of technologies and any of these do not provide a generic way to solve the gap between the requirements and characteristics of offered service and the access and capability information of target devices.

SUMMARY

According to a first aspect of the invention, an information processing system providing a composed service to a user device is provided. The system includes: a service acquisition unit configured to acquire a plurality of descriptions each of which defines a raw service provided by a service provider; a capability information acquisition unit configured to acquire capability information of the user device including what kind of data types the user device supports; a composition unit configured to compose the acquired descriptions to create a description which defines a composed service to be generated from a plurality of raw services to be supported by the user device based on the acquired capability information of the user device; a presentation unit configured to present the created description defining the composed service to the user device; a request acquisition unit configured to acquire a request for the composed service from the user device; a specifying unit configured to specify raw services composing the requested composed service based on the description defining the requested composed service; a processing unit configured to gather responses from the specified raw services composing the requested composed service, and to create the composite response of the requested composed service based on the gathered responses; and a response unit configured to respond the created composite response to the user device.

Further features of the present invention will become apparent from the following description of exemplary embodiments with reference to the attached drawings.

BRIEF DESCRIPTION OF DRAWINGS

FIG. 7 illustrates an example of a SL 311 according to an embodiment of the present invention.

FIG. 8 illustrates an example of a DL 312 according to an embodiment of the present invention.

FIG. 9 illustrates an example of a SDPL 313 according to an embodiment of the present invention.

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Figure 1:
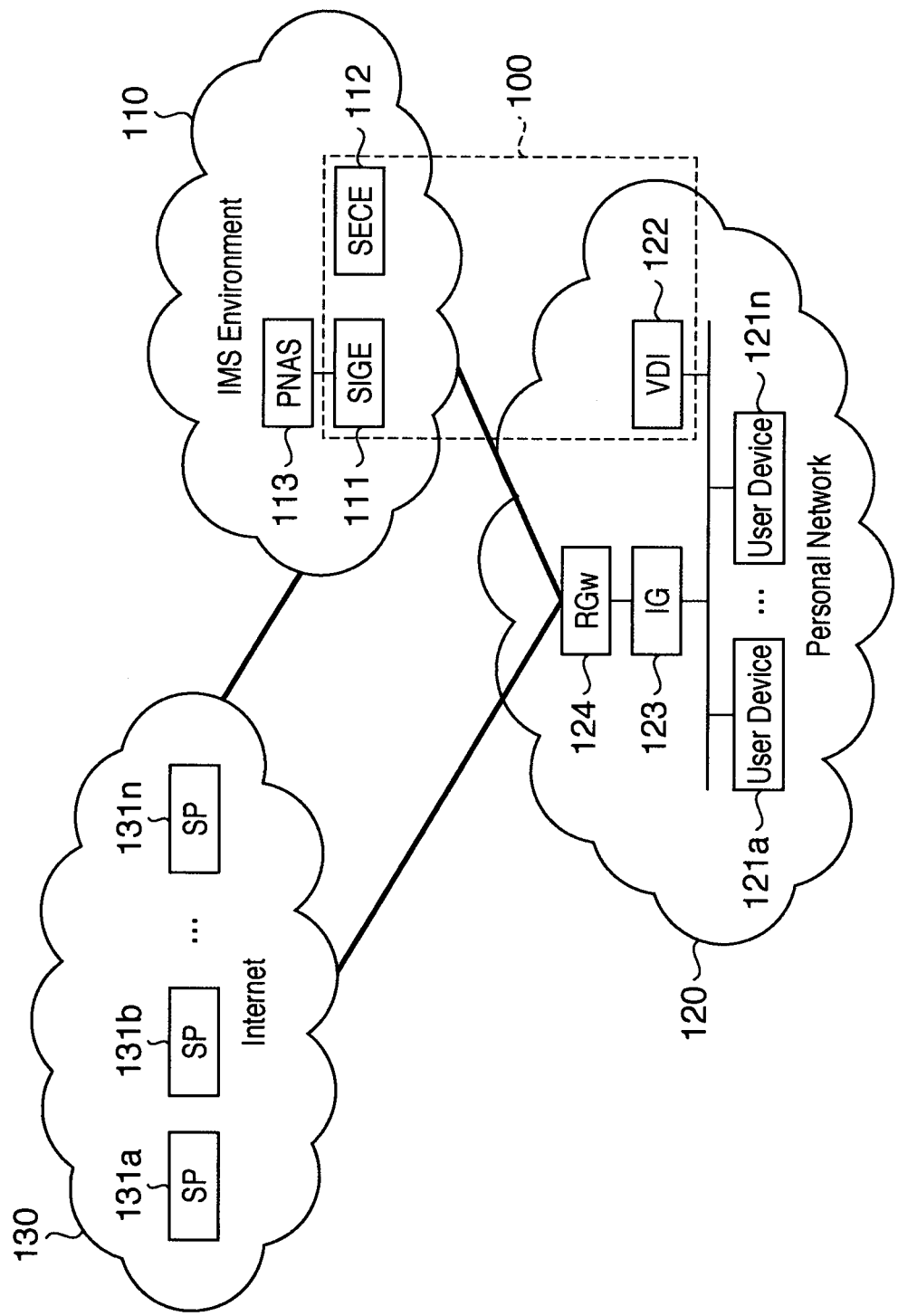
FIG. 1 illustrates an example overview of an environment including an information processing system 100 according to an embodiment of the present invention.

FIG. 1 illustrates an example overview of an environment including an information processing system 100 according to an embodiment of the present invention. The environment includes three networks: an IMS (IP Multimedia Subsystem) environment 110, a personal network 120, and the Internet 130.

The IMS environment 110 is managed by an operator. The personal network 120 is a network which a user creates personally, for example a home network and an in-car network. The personal network 120 includes one or more user devices 121a-121n, for example a TV, a game console, a Home NAS, and so on. The personal network 120 may include even multiple user LANs and PANs. The Internet 130 is a network which anyone can access, and includes one or more service providers (SPs) 131a-131n. Each of service providers 131a-131n provides some services. Hereinafter, services provided by service providers 131a-131n are called "raw services." In this embodiment, the personal network 120 is assumed to be a DLNA® network. However, the personal network may support the communication according to one or more of the following standards DLNA®/UPnP™, Bonjour®/Zeroconf, Bluetooth®, ZigBee®, and IEEE 802.15.4 variants. Bonjour® may be used for media consumption in a LAN environment. Bluetooth® may be used for discovery and communication between devices, including audio playback in a PAN. ZigBee® and IEEE 802.15.4 variants may be used for sensor and actuator devices for, for example, home automation scenario.

The information processing system 100 comprises three functional devices: a SIGE (Service Information Generation Engine) 111, a SECE (Service Execution Coordination Engine) 112, and a VDI (Virtual Device Instantiator) 122, to provide virtual devices tailored for each of user devices 121a-121n. According to this embodiment, the SIGE 111 and the SECE 112 are included in the IMS environment 110 and the VDI 122 is included in the personal network 120. Each virtual device is created by composing a set of raw services, taking into account the capabilities of the user devices 121a-121n and optionally preferences of the user of the user devices 121a-121n. The SIGE 111 collects information about the raw services to be virtualized, and creates a device description based on the collected information. The SECE 112 receives requests to the virtual device from the user devices 121a-121n, handles the requests, and returns corresponding responses from the raw services to the user devices 121a-121n.

In addition to the SIGE 111 and the SECE 112, in case of protocols which are designed to be used inside the personal network 120 for device discovery and control, such as UPnP™, virtual devices need to be instantiated in the personal network 120. Therefore, the information processing system 100 may include the VDI 122. The VDI 122 resides in the personal network 120 and instantiates virtual devices based on the device description created by the SIGE 111. The user devices 121a-121n in the personal network 120 can communicate with the SECE 112 through the virtual devices instantiated by the VDI 122 as if the virtual devices reside in the personal network 120. If a user device, which may be included in the Internet 130, can communicate with the SIGE 111 and SECE 112 directly, the user device may not use the VDI 122.

The personal network 120 also includes an IG (IMS Gateway) 123 and an RGw (Residential Gateway) 124. The IG 123 is an application layer gateway device between the IMS environment 110 and the personal network 120. The RGw 124 is a connectivity layer gateway device between the personal network 120 and the external network. The transportation and authentication of messages between the user device 121a-121n and the IMS environment 110 are intermediated by the IG and secured by security mechanisms provided by the IMS environment 110.

The IMS environment 110 also includes a PNAS (Personal Network Application Server) 113, which is an IMS enabler that allows exposing information about the personal network 120. The PNAS 113 helps to lower the wall between the user devices 121a-121n and the SIGE 111 by exposing access and control information about the user devices 121a-121n to the SIGE 111. The basic principle is that the IG 123 discovers the user devices 121a-121n in the personal network 120 and publishes the device's information to the PNAS 113, and the PNAS 113 aggregates the device's information of the personal network 120 to provide for the SIGE 111 and SECE 112.

The SIGE 111 creates virtual device description, which is description of a virtual device, by utilizing information fetched from the PNAS 113. The virtual device descriptions are fed into the VDI 122 and the VDI 122 instantiates virtual devices in the personal network 120 based on the descriptions. The SECE 112 accepts requests from the user devices through the VDI 122, invokes the raw services according to the virtual device description created by SIGE 111, and returns the composite response to the user devices 121a-121n via the VDI 122.

Since each virtual device works as an entry point for a set of services and the virtual device converts protocols when needed, the information processing system 100 according to this embodiment makes it possible for each of user devices 121a-121n to access a higher variety and also more complex, combined services than services the each of user devices 121a-121n natively supports.

A high-level description of an operation of the information processing system 100 is as follows. The descriptions of available services are fed into the SIGE 111 and the SIGE 111 creates virtual device descriptions, taking into account the capabilities of the user devices 121a-121n in the personal network 120. For each virtual device description, the VDI 122 instantiates a virtual device based on the virtual device description. The user devices 121a-121n communicate with the virtual devices in the personal network 120 in the same way as with other normal local devices. The VDI 122 redirects requests from the user devices 121a-121n to the SECE 112. The SECE 112 invokes involved services, receives, and composes the response and returns the composite response to the requesting user device via the VDI 122.

Now, three basic use cases of this embodiment are described. The first use case is an automatic media adaptation. Assume that the service provider 131a offers a VoD service as a raw service and the service provider 131b offers a transcoding service as another raw service. A user of the personal network 120 has a DMP (Digital Media Player) device as a user device which does not support the video codec provided by the service provider 131a. The SIGE 111 virtualizes the VoD service offered by the service provider 131a as a Virtual DMS (Digital Media Server) device. The PNAS 113 manages information about the user's DMP device.

The user turns on the DMP device and finds SP1-VoD as a DMS device. The user chooses the virtual DMS device, which is virtualizing the SP1-VoD service, in the same way as a local DMS device. The DMP device can show, browse through, and search in content list on SP1-VoD. The user chooses a content to play in the same way as with a local DMS device. The request is received by the SECE 112, service providers 131a and 131b are invoked, and the transcoded content on the VoD service is delivered to the DMP device. The user enjoys the media content without knowing the need for transcoding.

The second use case is making Slideshow from Photo Sharing Sites. Assume that the service provider 131a offers photo sharing and the service provider 131b makes slideshow from uploaded photos and returns a movie file. A user has a DMP device which does not have rich slideshow functionality. The SIGE 111 creates a virtual DMS device, which shows the slideshow created by the service provider 131b.

The user turns on the DMP device and finds the virtual DMS device. The user chooses the virtual DMS device in the same way as a local DMS device. The DMP device displays "Slideshow of photos on the service provider 131a" and the user chooses it. The request is received by the SECE 112, the service providers 131a and 131b are invoked, and a rich slide show movie is returned to the DMP device. The user enjoys the rich slideshow on the web site even though the DMP device which does not support online photo site access or rich slide show.

The third use case is a Video Uploading. Assume that the service provider 131a offers a video publishing service. A user has a content which he wants to upload to the video publishing service, but the content is on a DMS device and the media format of the content is not accepted by the video publishing service. The SIGE 111 virtualizes the service provider 131a as a virtual DMR (Digital Media Renderer) device and a virtual DMS device.

The user turns on user's DMC (Digital Media Controller) device and finds the content on his DMS device that he wants to upload to the service provider 131a. The user chooses the content and selects play on the virtual DMR device from the menu on the DMC device. The request is received by the SECE 112, the service providers are invoked, and the transcoded version of the content is uploaded to the service provider 131a. Now the user can confirm that the content is uploaded on the service provider 131a.

Figure 2:
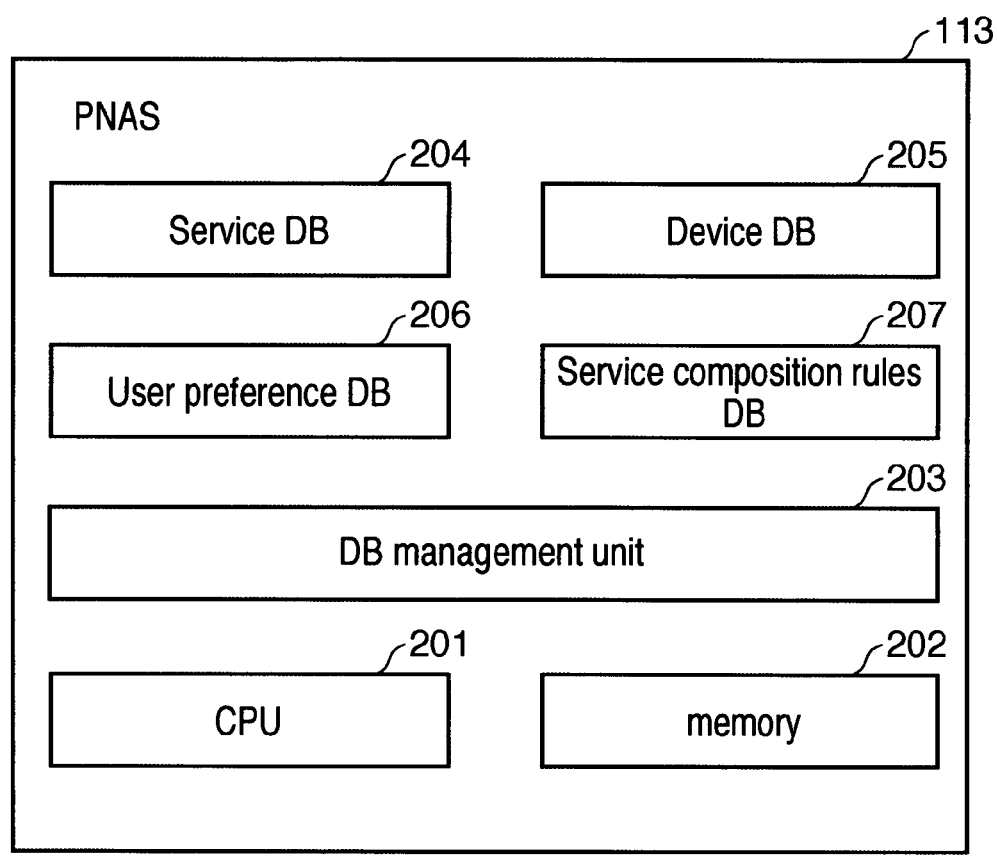
FIG. 2 illustrates an example block diagram of the PNAS 113 according to an embodiment of the present invention.

FIG. 2 illustrates an example block diagram of the PNAS 113 according to this embodiment. As mentioned, the PNAS 113 is an IMS enabler managing information about the personal network 120. The PNAS 113 comprises a CPU 201, a memory 202, and a DB management unit 203. The PNAS 113 further includes four databases: a service DB 204, a device DB 205, a user preference DB 206, and a service composition rules DB 207.

The CPU 201 controls overall operations of the PNAS 113. The memory 202 stores computer programs and data used for operations of the PNAS 113. The DB management unit 203 manages the DBs. The service DB 204 stores raw service information which the service providers 131a-131n offer and includes capabilities of the service providers 131a-131n. The DB management unit 203 acquires the raw service information from the service providers 131a-131n and inputs the raw service information to the service DB 204. To be done manually in the SLA between service providers 131a-131n and the IMS operator, raw services may be described in WSDL or equivalent and the DB management unit 203 subscribes to service announcements from the service providers 131a-131n which can be implemented as RSS (RDF Site Summary) feeds or equivalent. A PNAS operator of the PNAS 113 may manage the raw device information manually using the DB management unit 203. The DB management unit 203 may notify the SIGE 111 of the update of the service DB 204.

The device DB 205 stores device descriptions describing information of the user devices 121a-121n in the personal network 120. The DB management unit 203 may input the device descriptions with the associated IMPU of the IG 123. Thus, the information of the devices in the personal network 120 can be queried using the IMPU as the key. The DB management unit 203 may notify the SIGE 111 of the update of the device DB 205.

The PNAS 113 cooperates with the IG 123 to obtain the capability information and device descriptions of the user devices 121a-121n. The IG 123 sends M-search message to the personal network 120. The user devices 121a-121n in the personal network 120 respond to the M-search from the IG 123. The IG 123 fetches the device descriptions from the user devices 121a-121n that responded to the M-search. The IG 123 detects the capability of found user devices 121a-121n by issuing appropriate UPnP™ messages and uploads their capability information and device descriptions to the DB management unit 203.

The user preference DB 206 stores user preferences describing information of the preferences of the user who manages the personal network 120. The user may register his preference into the user preference DB 206 using the DB management unit 203. The DB management unit 203 may notify the SIGE 111 of the update of the user preference DB 206.

The service composition rules DB 207 stores rules to compose raw services. An operator of the PNAS 113 may register rules into the service composition rules DB 207 using the DB management unit 203. The composition rules include basic rules which enable the composition unit 306 to determine possible combination of services and devices, for example, transcoding service can be combined with media streaming services and the outcome of the composition is a new media streaming service. The composition rules may also include explicit rules which describe a composed service which is composed of an explicit set of raw services. The DB management unit 203 may notify the SIGE 111 of the update of the service composition rules DB 207.

Figure 3:
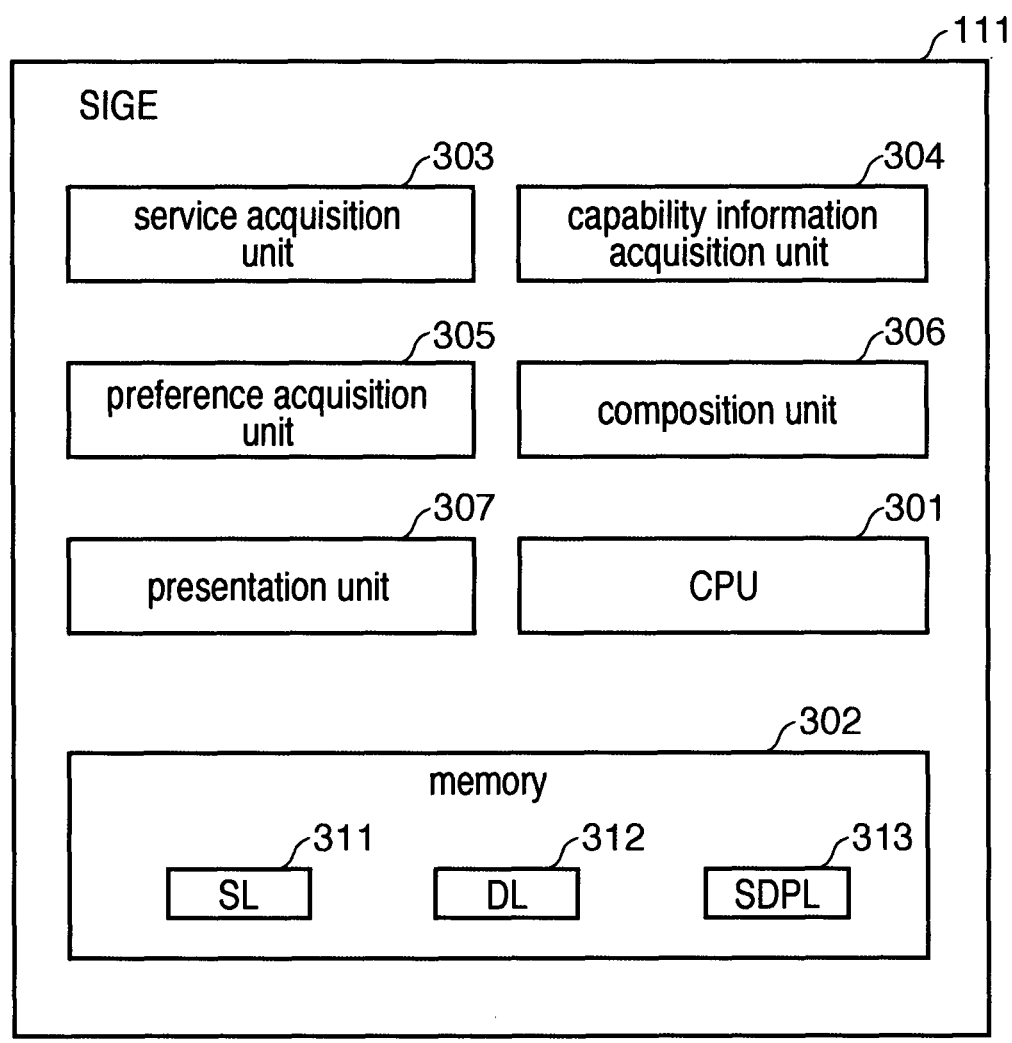
FIG. 3 illustrates an example block diagram of the SIGE 111 according to an embodiment of the present invention.

FIG. 3 illustrates an example block diagram of the SIGE 111 according to this embodiment. As mentioned, the SIGE 111 collects information of available raw services and creates device descriptions based on the information. The SIGE 111 comprises a CPU 301, a memory 302, a service acquisition unit 303, a capability information acquisition unit 304, a preference acquisition unit 305, a composition unit 306, and a presentation unit 307. The preference acquisition unit 305 is optional.

The CPU 301 controls overall operations of the SIGE 111. The memory 302 stores computer programs and data used for operations of SIGE 111. In order for the SIGE 111 to create a virtual device, the SIGE 111 obtains information of the list of available raw services, user devices 121a-121n, and service composition rule, and optionally user preference. Since the PNAS 113 has the service DB 204, the device DB 205, the user preference DB 206, and the service composition rules DB 207, the PNAS 113 can provide the necessary information through APIs of the PNAS 113.

The service acquisition unit 303 acquires a plurality of descriptions each of which defines a raw service provided by a service provider 131. The service acquisition unit 303 may acquire one or more descriptions each of which defines a raw service provided by the IMS environment 110. The capability information acquisition unit 304 acquires capability information of the user devices 121a-121n. The capability information includes what kind of data types the user device 121 supports. The capability information may include other capabilities, for example, screen size, stereo/mono, and etc. The capability information of the user devices 121a-121n may be published by a user of the user device 121a-121n based on a trust relationship between the user and an operator of the IMS environment 110. The composition unit 306 composes the acquired descriptions to create a description which defines a composed service to be generated from a plurality of raw services to be supported by the user device 121a-121n based on the acquired capability information of the user device 121a-121n. The presentation unit 307 presents the created description defining the composed service to the user device 121a-121n. The memory 302 includes a SL (Service List) 311, a DL (Device List) 312, and a SDPL (Service Device Pair List) 313, which are described in detail later.

Figure 4:
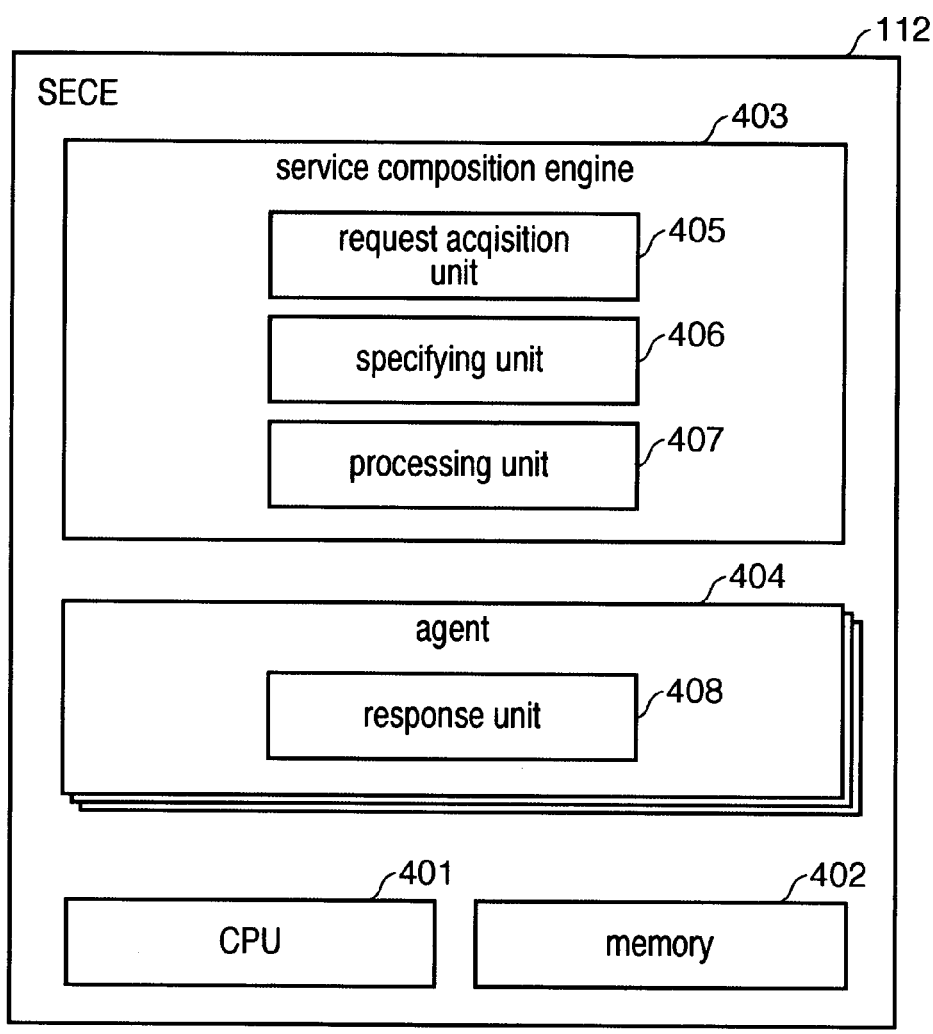
FIG. 4 illustrates an example block diagram of the SECE 112 according to an embodiment of the present invention.

FIG. 4 illustrates an example block diagram of the SECE 112 according to this embodiment. The SECE 112 comprises a CPU 401, a memory 402, a service composition engine 403, and agents 404.

The CPU 401 controls overall operations of the SECE 112. The memory 402 stores computer programs and data used for operations of the SECE 112. Since the service descriptions and composition flow descriptions are in standardized formats, the service composition engine 403 may be achieved by existing enablers of service composition technology. In this embodiment, the service composition engine 403 includes a request acquisition unit 405, a specifying unit 406, and a processing unit 407. The request acquisition unit 405 acquires a request for the composed service from the user device 121a-121n directly or indirectly. The specifying unit 406 specifies raw services composing the requested composed service based on the description defining the requested composed service. The requests for the composed service from the user device 121a-121n may be authenticated, authorized, and accounted by utilizing the AAA mechanism provided by the IMS environment 110. The processing unit 407 gathers responses from the specified raw services composing the requested composed service, and creates the composite response of the requested composed service based on the gathered responses.

In addition, the SECE 112 receives and sends UPnP™ requests and responses towards user devices 121a-121n. Since a set of services is virtualized as a device, the SECE 112 manages different context for each set of services. Therefore, the SECE 112 includes an agent 404 for each set of services and makes it handle requests and responses for that particular set of services. That is, each agent 404 basically works as an UPnP™ or DLNA® device and handles UPnP™ actions and event subscription as same way as normal devices handle. The agent 404 includes a response unit 408. The response unit 408 responds the created composite response to the user device 121a-121n.

Figure 5:
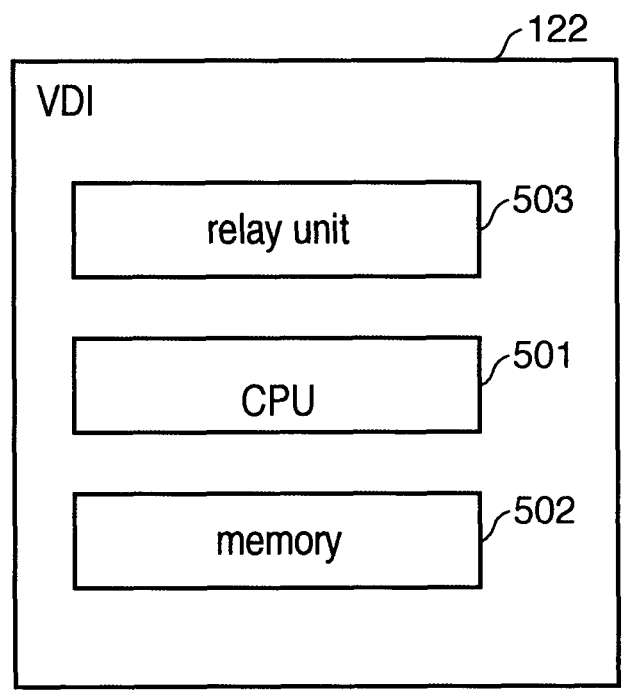
FIG. 5 illustrates an example block diagram of the VDI 122 according to an embodiment of the present invention.

FIG. 5 illustrates an example block diagram of the VDI 122 according to this embodiment. The VDI 122 resides in each personal network 120 of a user and instantiates virtual devices in the personal network 120 so that the user devices 121a-121n in the personal network 120 can access services. The VDI 122 may be integrated with the IG 123, RGw 124, or other devices in the personal network 120. The VDI 122 comprises a CPU 501, a memory 502, and a relay unit 503. The CPU 501 controls overall operations of the VDI 122. The memory 502 stores computer programs and data used for operations of the VDI 122. The relay unit 503 relays requests and responses between the user devices 121a-121n and the SIGE 111 and SECE 112. The relay unit 503 converts protocols if needed, so that the user devices 121a-121n can communicate with the SIGE 111 and SECE 112.

Figure 6:
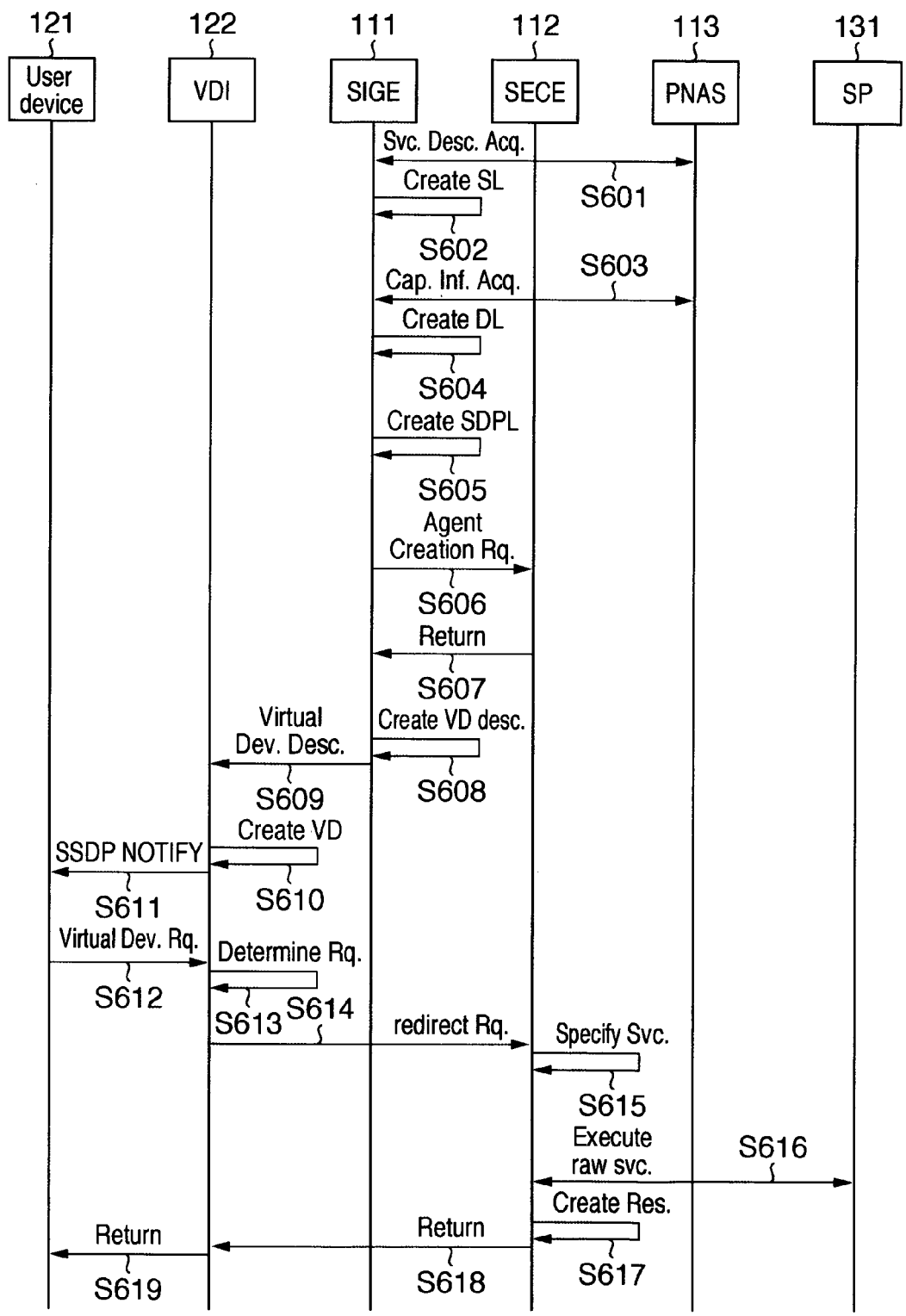
FIG. 6 illustrates an example of overall operations of the information processing system 100 according to an embodiment of the present invention.

FIG. 6 illustrates an example of overall operations of the information processing system 100 according to this embodiment. The CPU included in each device executes computer programs stored in memory of each device to process these operations.

First, the information processing system 100 prepares virtual devices by performing operations from step S601 to step S608. The preparation of the virtual devices is classified into two phases. One phase is a general service preparation which is commonly done once for a particular set of services. The other phase is per-user service virtualization which is done for each personal network individually.

The General Service Preparation phase will be described. In step S601, the service acquisition unit 303 acquires the raw service information from the service DB 204 in the PNAS 113. As described, the service DB 204 stores the raw service description provided by the service providers 131a-131n. The service acquisition unit 303 may subscribe to the service DB 204 by SIP SUBSCRIBE or equivalent and detect the update of the raw services. In step S602, the composition unit 306 creates a SL 311 based on the acquired service description of the raw services.

FIG. 7 illustrates an example of a SL 311 according to this embodiment. The SL 311 is a list of raw services and composed services. The raw services in the SL 311 are services acquired at step S601. In the SL 311 in FIG. 7, the services "S1", "S2", "S3", "S4", and "S5" are raw services. The composed services in the SL 311 are services to be generated from the raw services in the SL 311. In the SL 311 in FIG. 7, the service "S6" is a composed service. The "Service ID" 701 represents identification uniquely assigned to each of the services. The "Service name" 702 represents a name assigned to each of the services. The "Capability" 703 represents what kind of data types each of the services supports. The "Device class" 704 represents which DLNA® device class each of the services corresponds. Note that a composed service which is composed of multiple raw services is also listed as a service in the SL 311. For example, the service "S6" is composed of the raw services "S3" and "S5". In case of a composed service, the composition flow description (for example, written in BPEL4WS) is also stored in the service DB 204 and the service acquisition unit 303 acquires the composition flow description as well as service descriptions of the involved services. The composition flow description describes how to compose raw services to generate a composed service. Each entry of the SL 311 has a reference to the service description and the flow composition description.

The composition unit 306 classifies services in the SL 311 based on service class and maps the services to device class in UPnP™ according to service composition rules stored in the service composition rules DB 207. For example, VoD services are mapped to DMS. There may be services which are not directly mapped to DLNA®/UPnP™ device class, for example, transcoding service.

Next, Per-user Service Virtualization phase will be described with reference to FIG. 6. This phase is performed for each personal network 120. In step S603, the capability information acquisition unit 304 acquires capability information of the user devices 121a-121n. The capability information acquisition unit 304 may subscribes the device DB 205 of the PNAS 113 by SIP SUBSCRIBE or equivalent and detect that the capability information is updated. In step S603, the preference acquisition unit 305 may also acquire user preference from the user preference DB 206 in the PNAS 113. The preference acquisition unit 305 may subscribe to the user preference DB 206 by SIP SUBSCRIBE or equivalent and detect the update of the user preference.

In step S604, the composition unit 306 creates a DL 312 based on the acquired capability information of the user devices 121a-121n. FIG. 8 illustrates an example of a DL 312 according to this embodiment. The DL 312 is a list of the user devices 121a-121n in the personal network 120. The "Device ID" 801 represents identification uniquely assigned to each of the user devices 121a-121n. The "Device name" 802 represents a name assigned to each of the user devices 121a-121n. The "Capability" 803 represents what kind of data types each of the user devices supports. The "Device class" 804 represents which DLNA® device class each of the user devices 121a-121n corresponds.

In step S605, the composition unit 306 creates a SDPL 313. The SDPL 313 is a list of pairs of possible service and device, and has complement information which is used to create a virtual device needed to enable the target device to consume the paired service. FIG. 9 illustrates an example of a SDPL 313 according to this embodiment. The "Service ID" 901 corresponds to the "Service ID" 701 in the SL 311. The "Device ID" 902 corresponds to the "Device ID" 801 in the DL 312. The "Needed virtual device" 903 represents a DLNA® device class which the virtual device acts. The "Invoked Services" 904 represents the raw service(s) which is invoked to the service. That is, if the service is a raw service, the "Invoked Services" 904 is the raw service itself. On the other hand, if the service is a composed service, the "Invoked Services" 904 are raw services which is included the composed service. To create the SDPL 313, three operations are performed.

At first operation, the composition unit 306 may apply the user preference, for example, filtering out non-preferred services and combining particular services if the preference acquisition unit 305 acquired the user preference at step S603. If any service composition rule is specified by the user, the composition unit 306 may apply the service composition rule. If new composed services are found, the composition unit 306 may put the new composed services into the SL 311 and mapped to DLNA®/UPnP™ device classes if possible.

At second operation, the composition unit 306 compares the SL 311 and DL 312, and determines possible mappings between services and devices based on device class. For example, DMR and DMS are mapped as a possible service/device pair whereas a pair of UPnP® IGD and DMS is ignored. One service may be mapped to multiple user devices. The composition unit 306 may apply the user preference in consuming device for each service, that is, filtering out undesired combination between services and user devices, and drops such undesired combinations from the SDPL 313.

At third operation, for each entry in the SDPL 313, the composition unit 306 determines whether the capabilities of service and the target user device are match. If capabilities of the target user device and service match, go to the next step. Otherwise, the composition unit 306 checks the SL 311 and looks for service(s) which adapt the service to the target user device so that the target device can consume the service. For media streaming service, MRF (Media Resource Function) in the IMS core is also considered as a raw service to apply.

If a valid set of such adaptor services is found, a composition flow description (for example, written in BPEL4WS) which invokes the set of services is created and associated with the entry. In case of a composed service, the description is appended to the existing one. Otherwise, the composition unit 306 gives up coupling the service and the user device, and removes the entry from the SDPL 313. The composition unit 306 may re-create or update the SDPL 313 when the update of one of the DBs in the PNAS 113 is detected.

In step S606, for each entry in the SDPL 313, the composition unit 306 issues an Agent Creation Request to the SECE 112 to create an agent 404 which works for that particular set of services. The request includes the service descriptions of the involved raw services, the composition flow description, and the capability of the target user device. The composition unit 306 sends the SDPL 313 to the SECE 112 as well. If there is already an agent 404 in the SECE 112 which works for the same particular set of services, the agent 404 is re-used.

In step S607, the agent 404 returns control, event, and SCPD (service control protocol declaration) URLs which points to the agent 404 that works for the particular set of services. These URLs are the entry points for control messages in the UPnP™ standard. The SECE 112 receives the Agent Creation Request from the composition unit 306 that includes a set of services and their descriptions, the flow composition description and the capability of the target device. The SECE 112 determines whether an agent 404 which works for the particular set of services already exists. If exists, the SECE 112 returns the control, event, and SCPD URLs of the found agent 404 to the composition unit 306. Otherwise, the SECE 112 creates a new agent 404 with the parameters given in the request and returns the newly created control, event, and SCPD URL of the composed services to the composition unit 306.

The agent 404 registers the service descriptions and flow composition description to the service composition engine 403 and obtains its entry points, for example, request URIs. The agent 404 performs service preparation if needed, for example, fetching content list on the involved services in case the agent 404 works as a media server. As can be seen, the agent preparation can be skipped when a responsible agent 404 is already working for a particular set of services and the agent 404 may be shared by users who request that particular set of services. This has several advantages from performance and cost perspective, for example, fetched contents can be cached for future requests.

In step S608, the presentation unit 307 creates a virtual device description with a new QUID (Universally Unique Identifier). More specifically, the presentation unit 307 performs the following operations. The presentation unit 307 loads the template of device description that is suitable for the target virtual device from the SDPL 313 and overwrites the control, event, and SCPD URLs in the description by those returned from the agent 404. This is done in order to tell the relay unit 503 in the VDI 122 the URLs of the corresponding agent 404. Alternatively, this information can be added into the device description as additional XML nodes which are read only by the VDI 122. The presentation unit 307 adds a description for the target user device that the virtual device is created for. The virtual device descriptions are stored into the SDPL 313. Additional information which the SECE 112 needs to invoke raw service(s) is also stored into the SDPL 313, together with the virtual device description. The additional information includes the order to invoke the involved services, the service class and so on, and may be described in a flow description language, for example, BPEL4WS.

Next, the information processing system 100 creates virtual devices in the VDI 122 by performing operations from step S609 to step S611. In step S609, the relay unit 503 downloads the device descriptions of virtual devices from the SIGE 111. Step S609 may be triggered by notification of the SDPL 313 update from the presentation unit 307. Alternatively, the presentation unit 307 may push the device descriptions to the relay unit 503, for example, by TR-069. In that case, the notification of the SDPL 313 update from the SIGE 111 is replaced by the push request.

In step S610, for each device description downloaded from the SIGE 111, the relay unit 503 creates a virtual device with the downloaded device description. From other devices in the personal network 120, the instance looks as a device which has the device description downloaded from the SIGE 111. The relay unit 503 stores the control, event, and SCPD URLs of the agent 404 that is written in the virtual device description for its internal use. The information is used to determine to where the relay unit 503 should forward the requests from local devices. Unique control, event and, SCPD URLs are created for the virtual device and those URLs in the device description are overwritten before being sent to user devices 121a-121n in the personal network 120 so that requests from the user devices 121a-121n in the personal network 120 go through the virtual device.

In step S611, each virtual device created by the relay unit 503 sends out a SSDP NOTIFY message to the personal network 120 so that user devices 121a-121n in the personal network 120 can find the virtual device(s) created by the relay unit 503. Alternatively, a virtual device can wait for M-search from the target user device that the virtual device is created for and responds only for the target user device. Note that the target user device is also described in the virtual device description loaded from the SIGE 111 and the VDI 122 can be configured to limit the visibility of the virtual device to the target device by, for example, ignoring discovery message and return error messages to devices other than the target device. By this way, the user of the personal network 120 does not have to look for a suitable virtual device for each consuming device.

Finally, the information processing system 100 provides services, which are raw services or composed services, to the user devices 121a-121n by performing operations from step S612 to step S619. In step S612, the relay unit 503 receives requests from the user device 121 in the personal network 120.

In step S613, the relay unit 503 determines whether the request expects incoming connection from the corresponding agent 404 or any other nodes resides outside of the personal network 120, for example, event notification and media request towards devices in the personal network 120. If so, the relay unit 503 requests the RGw 124 to add a port mapping towards the device that expects incoming connections and overwrite URLs in the request by external IP address of RGw 124 and mapped port number. It is assumed that the RGw 124 supports UPnP™ IGD profile.

In step S614, the relay unit 503 redirects the requests to the corresponding agent 404. Alternatively, in case the relay unit 503 can respond the request by itself, for example, based on the previously cached responses from the SECE 112, the relay unit 503 may create the response by itself. The request acquisition unit 405 acquires the request for the virtual service from the relay unit 503. In step S615, and the specifying unit 406 specifies the raw services invoked in the virtual service based on the SDPL 313.

In step S616, the processing unit 407 gathers responses from the specified raw services. When the virtual service is a raw service, the processing unit 407 executes the raw service. When the virtual service is a composed service, the processing unit 407 executes the raw services specified at the step S615.

In this step S616, an agent 404 basically works as a UPnP™ or DLNA® device and handles UPnP™ actions and event subscription as same way as normal devices do. However, there are a number of actions which may need special treatments. Representative ones of such actions are described in the following.

Representative. UPnP™ actions which may need special treatment are as follows. Although there could be some others depending on services offered, those which may be needed for achieving the use cases described above are focused.

First action is BROWSE and SEARCH on virtual DMS device. When these actions are invoked, the agent 404 accesses the external services, to get available content list and to return the list with appropriate metadata. First, the agent 404 invokes the service which has the actual content list and feeds the content list into internal Content Directory Service (CDS). Next, the agent 404 performs BROWSE or SEARCH depending on the request and overwrites <res> node in the result XML (DIDL-Lite) document as follows: The value (content URL) needs to be overwritten so that the requester device can be directed to the composed service, and if transcoding service(s) is involved, the protocolInfo attribute is overwritten by that of output media types of the transcoding service that is applied last. Finally, the agent 404 returns the action result with the modified metadata.

Second action is GetProtocolInfo on both virtual DMS and virtual DMR devices. When the action is invoked, the agent 404 needs to return a list of media types including types which are only available after applying transcoding service(s). The list should include at least one media type which the target device can accept because the SIGE 111 has arranged the set of services taking into account that.

In step S617, the processing unit 407 creates a response for the requested virtual service. When the requested virtual service is a raw service, the processing unit 407 takes the response from the raw service as the response for the requested virtual service. When the requested virtual service is a composed service, the processing unit 407 creates a composite response based on the responses gathered from the specified raw services.

In step S618, the response unit 408 responds the created response to the relay unit 503. In step S619, the relay unit 503 redirects the composite response to the user device 121.

During these operations, the VDI 122 may perform the following Shutdown phase. Each virtual device sends out a SSDP BYE message to the personal network 120 when the virtual device is destroyed for some reasons, for example, the raw service(s) to which the virtual device corresponds is stopped or the platform on which the virtual device works is shutting down.

Although one embodiment has been described above, there can be other embodiments. Each unit in the SIGE 111 may be deployed on a separated node if the API of the PNAS 113 is defined so that external nodes can retrieve necessary information in the PNAS 113. Each unit in the SIGE 111 may be deployed in the personal network 120, for example, in the IG 123. In case the device information for whole personal network 120 is not necessary, for example, only a LAN is in the interest, such a deployment can be an option.

Each unit in the VDI 122 may be deployed on a physically separated unit as far as it can fully communicate with devices in the personal network 120, for example, on PC. In that case, appropriate interfaces for the VDI 122 to communicate with the SIGE 111 and SECE 112 are needed. SIP may be an interface between the VDI 122 and IG 123, and the IG 123 may intermediate communication with the SIGE 111 and SECE 112.

Each unit in the SECE 112 may reside either in the IMS environment 110 or the personal network 120 because the VDI 122 intermediates communication between the personal network 120 and the SECE 112. From performance perspective, placing the SECE 112 in the IMS environment 110 is better since only the first request and the final response go over the user's access link. Moreover, since the agents 404 can be shared by multiple users, caching already processed data can improve the performance and reduce the cost.

However, in case a small number of users share an agent 404, placing the SECE 112 in the IMS environment 110 may result in insufficient cost performance ratio. Not only that, but also it can cause scalability problems. In such a case, placing the SECE 112 in personal networks has certain advantages.

The user device may be included in the Internet 130. When the user device can communicate the SIGE 111 and SECE 112 without converting protocols, the user device and the SIGE 111 and SECE 112 may communicate without the VDI 122.

Although embodiment mentioned above assumes raw services from external service providers 131a-131n are delivered to the personal network PN-to-PN communication may be deployed, that is, delivering services to and from personal networks. Such an embodiment of the invention to PN-to-PN communication is noted below.

Using the same principle as delivering external services to a PN, the invention can deliver services to and from PNs. Not only that, it is also possible to involve external service providers in doing so. Since user devices in PNs can be acquired by the PNAS 113, the SIGE 111 can also acquire the user devices and their capabilities. Therefore, if service or device composition rules are input to the SIGE 111, it is possible to create a virtual device which enables to interconnect a device in a PN to another device in another PN. This enables a number of features:

Remote access: This embodiment enables the user to share his devices with others remotely, for example, the user may allow his friends to access his DMS device without requesting his friends to connect to his personal network.

Capability matching: If the device capabilities do not much, external service providers can be involved even in PN-to-PN communication as same as the SP-to-PN case, for example, transcoding service can be applied. This will release users from being bothered for compatibility issues when trying PN-to-PN device communications.

Bridging different protocol domains: This embodiment may be used to bridge or interconnect different protocol domains, for example, it is possible to expose non-UPnP™ devices as virtual UPnP™ devices if an appropriate translation mechanism is implemented in the VDI 122. Such a mechanism for Bluetooth® and UPnP™ is found, for example. Even a usage of media consuming device to control non-media service can be considered, that is, virtualizing sensors and actuators connected by ZigBee® as items in a virtual DMS in a DLNA® network enables DMP in the DLNA® network to get information from the sensors and control the actuators through the virtual DMS. Such a virtualization may also be done if the composition rule DB has the rule that describes it.

In order to apply the invention for PN-to-PN communication, service composition rules and access control rules are supplied to the SIGE 111. The user preference DB 206 of the PNAS 113 may be used to hold such information as well.

One embodiment according to the invention combines multiple raw services and exposes a set of services as a device. By combining multiple raw services, the embodiment enables devices which have limited capabilities to access wider set of services available in the world. Since it is harder to add new functionalities on devices compared to PCs, the advantage is appreciated more than cases of delivering services to PCs.

Moreover, the advantage of one embodiment will provide benefit for all the three parties involved. For external SPs, one embodiment enables them to deliver their services to wider set of consumer devices without paying cost to improve their capabilities. For operators, one embodiment gives an ability to compose a value adding service for their customers by combining existing external services. This means that the operator does not have to pay cost for implementing his own services. They also possibly obtain opportunities for charging some fees to external SPs, for example, managing fees and transcoding fees. For users, one embodiment makes it possible for them to access wider range of services without sitting in front of PC and they will not have to be bothered for compatibility issues, such as codec and file format.

In addition, one embodiment has several advantages in enabling service virtualization. A virtual device can limit its partner device to the target device by referring to the target device information from the SIGE 111. Because of this feature, user does not have to look for a suitable virtual device for each consuming device. An agent 404 is created for a set of services and it may be shared by those which access the same set of services. This has several advantages from performance and cost perspective. For example, transcoding is a heavy operation in terms of time and processing power, so it is efficient to perform the operation in the network side and share the output by as many users as possible. This will also have a potential to reduce energy consumption.

Furthermore, the invention can be applied for exposing PN, e.g. PN to WAN and PN to PN communication, with the same principles. This will boost sharing user-generated contents and devices which will be more important in the future and since the operator is involved in that case, they have a chance to make profit from that.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing system providing a composed service to a user device, the information processing system comprising:
    at least one processor;
    at least one memory coupled to the at least one processor and comprising computer readable program code that when executed by the at least one processor causes the at least one processor to perform operations comprising:

acquiring a plurality of descriptions each of which defines a raw service provided by a service provider;

acquiring capability information of the user device including what kind of data types the user device supports;

composing the acquired descriptions to create a description which defines a composed service to be generated from a plurality of raw services to be supported by the user device based on the acquired capability information of the user device;

presenting the created description defining the composed service to the user device;

acquiring a request for the composed service from the user device;

specifying raw services composing the requested composed service based on the description defining the requested composed service;

specifying raw services composing the requested composed service based on the description defining the requested composed service;

gathering responses from the specified raw services composing the requested composed service, and to create the composite response of the requested composed service based on the gathered responses;

responding to the created composite response to the user device; and presenting, by at least one of the at least one processor which is included in a same network with the user device and supports a protocol available to the user device, the user device with the description of the composed service by use of the protocol available to the user device so that the user device can recognize the composed service as a service provided by a local device in the same network, wherein the same network includes a plurality of user devices which support different protocols, wherein, the description of the composed service is presented only to user devices which support the protocol used for presenting the description of the composed service.

2. The system according to claim 1, wherein the user device and the at least one of the at least one processor are included in a personal network supporting the communication according to one or more of the following standards DLNA®/UPnP™, Bonjour®/Zeroconf, Bluetooth®, ZigBee®, and IEEE 802.15.4 variants, and the at least one of the at least one processor acts as a gateway connecting the personal network and the external network.

3. The system according to claim 1, wherein the description of the raw service are provided by another user device instead of or in addition to the service provider.

4. An information processing method providing a composed service to a user device, comprising the steps of:

acquiring a plurality of descriptions each of which defines a raw service provided by a service provider;

acquiring capability information of the user device indicating what kind of data types the user device supports;

composing the acquired descriptions to create a description which defines a composed service to be generated from a plurality of raw services to be supported by the user device based on the acquired capability information of the user device;

presenting the created description defining the composed service to the user device via at least one processor which is included in a same network with the user device and supports a protocol available to the user device;

acquiring a request for the composed service from the user device;

specifying raw services composing the requested composed service based on the description defining the requested composed service;

gathering responses from the specified raw services composing the requested composed service;

creating the composite response of the requested composed service based on the gathered responses, and responding the created composite response to the user device, wherein the at least one processor presents the user device with the description of the composed service by use of the protocol available to the user device so that the user device can recognize the composed service as a service provided by a local device in the same network, wherein the same network includes a plurality of user devices which support different protocols, wherein the description of the composed service is presented only to user devices which support the protocol used for presenting the description of the composed service.

5. A computer program product comprising a non-transitory computer-readable medium having a computer program that is executed by at least one processor to provide a composed service to a user device and to:

acquire a plurality of descriptions each of which defines a raw service provided by a service provider;

acquire capability information of the user device indicating what kind of data types the user device supports;

compose the acquired descriptions to create a description which defines a composed service to be generated from a plurality of raw services to be supported by the user device based on the acquired capability information of the user device;

present the created description defining the composed service to the user device via at least one of the at least one processor which is included in the same network with the user device and supports a protocol available to the user device;

acquire a request for the composed service from the user device;

specify raw services composing the requested composed service based on the description defining the requested composed service;

gather responses from the specified raw services composing the requested composed service;

create the composite response of the requested composed service based on the gathered responses, and respond the created composite response to the user device, wherein the at least one of the at least one processor presents the user device with the description of the composed service by use of the protocol available to the user device so that the user device can recognize the composed service as a service provided by a local device in the same network, wherein the same network includes a plurality of user devices which support different protocols, wherein, the description of the composed service is presented only to user devices which support the protocol used for presenting the description of the composed service.

6. A computer-implemented information processing method providing a composed service to a user device, comprising the steps of:

acquiring a plurality of descriptions each of which defines a raw service provided by a service provider;

acquiring capability information of the user device indicating what kind of data types the user device supports;

composing the acquired descriptions to create a description which defines a composed service to be generated from a plurality of raw services to be supported by the user device based on the acquired capability information of the user device;

presenting the created description defining the composed service to the user device via at least one processor that communicates with the user device and supports a protocol available to the user device; and acquiring a request for the composed service from the user device, wherein the at least one processor presents the user device with the description of the composed service by use of the protocol available to the user device so that the user device can recognize the composed service as a service provided by a local device in the same network, wherein the same network includes a plurality of user devices which support different protocols, wherein the description of the composed service is presented only to user devices which support the protocol used for presenting the description of the composed service.

* * * * *

UNITED STATES PATENT AND TRADEMARK OFFICE
CERTIFICATE OF CORRECTION

PATENT NO.        : 8,966,005 B2                                          Page 1 of 1
APPLICATION NO.   : 13/257428
DATED             : February 24, 2015
INVENTOR(S)       : Yasukawa et al.

It is certified that error appears in the above-identified patent and that said Letters Patent is hereby corrected as shown below:

On Title Page:

Item 73, Assignee; Please correct the spelling of the Assignee name:
"Telefonaktiebolatet L M Ericsson (publ)"
To read: --Telefonaktiebolaget L M Ericsson (publ)--

Signed and Sealed this
Twenty-third Day of June, 2015

Michelle K. Lee
*Director of the United States Patent and Trademark Office*